March 22, 1955   M. WALLACE   2,704,806
PANORAMIC DEVICES
Filed April 19, 1946   2 Sheets-Sheet 1
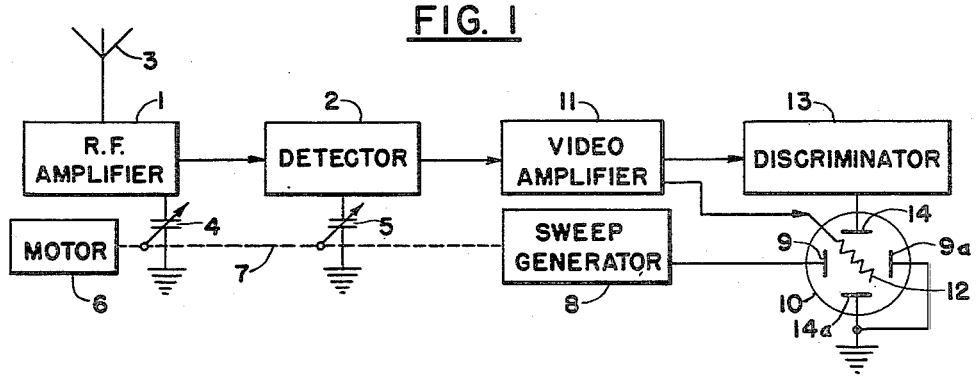
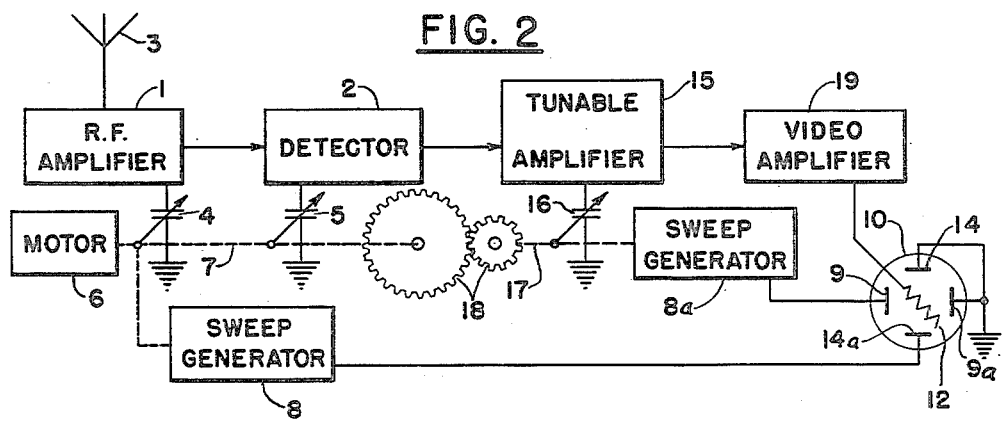
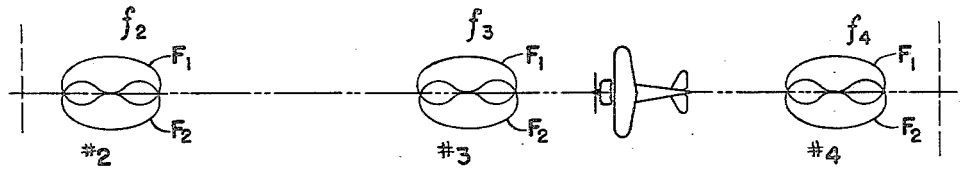
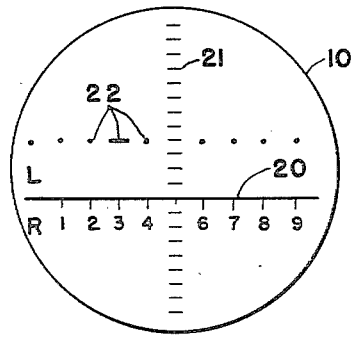
Inventor
MARCEL WALLACE
By Hyman Hurwitz
Attorney March 22, 1955  M. WALLACE  2,704,806
PANORAMIC DEVICES
Filed April 19, 1946  2 Sheets-Sheet 2

Inventor
MARCEL WALLACE
By Hyman Hurwitz
Attorney

United States Patent Office 2,704,806
Patented Mar. 22, 1955

2,704,806

PANORAMIC DEVICES

Marcel Wallace, Fairfield County, Conn., assignor, by mesne assignments, of one-half to said Wallace, doing business as Panoramic Laboratories, East Port Chester, Conn.

Application April 19, 1946, Serial No. 663,313

10 Claims. (Cl. 250—20)

The present invention relates generally to panoramic devices and relates in particular to panoramic devices for providing a simultaneous indication of the frequencies of two signals.

It is an object of the present invention to provide translating equipment for indicating simultaneously the frequency of a carrier and of a modulation signal associated with said carrier.

It is a further object of the invention to provide apparatus for indicating, in terms of position on a two-dimensional surface, the carrier frequency and the modulation frequency of a modulated carrier.

It is another object of the invention to provide apparatus for indicating the value of a carrier frequency in terms of position along one axis and for simultaneously indicating the value of a modulation frequency along an axis making an angle with said one angle.

It is still a further object of the invention to provide an indication in the form of an intensified spot on the face of a cathode ray indicator, of the simultaneous frequency values of a carrier and of a modulation signal associated therewith.

Another object of the invention resides in the provision of panoramic receivers of the above character in conjunction with an airway defined by one or more beacon transmitters, for display of the geographical relation of an aircraft to the airway.

Still another object of the invention is to provide a system, utilizing panoramic receivers of the above character in conjunction with a plurality of altitude-course transmitters located in each of a plurality of aircraft, for displaying simultaneously the absolute or the relative altitudes of the various craft, together with their relation to a given airway as defined by one or more beacon transmitters.

The above and further objects and advantages of my invention will become evident upon study of the accompanying drawings, Figures 1 and 2 representing in schematic block diagram two specific embodiments of my invention.

This invention also consists in various features of construction and in the combination and arrangement of the various elements thereof, to be hereinafter fully described, illustrated in the accompanying drawings and specifically pointed out in the appended claims.

In the drawings:

Figure 1 is a schematic block diagram of one embodiment of a novel panoramic receiver for providing simultaneous indications of the values of a pair of frequencies;

Figure 2 is a schematic block diagram of a further embodiment of my invention for providing simultaneous indications of the values of a pair of frequencies;

Figure 3 represents the appearance of the face of a cathode ray indicator, when utilized as part of the receivers of Figures 1 and 2;

Figure 5:
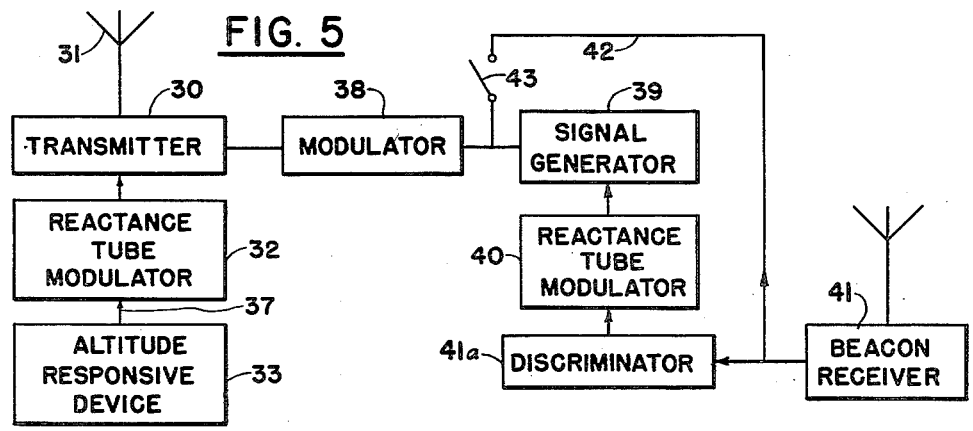
Figure 7:
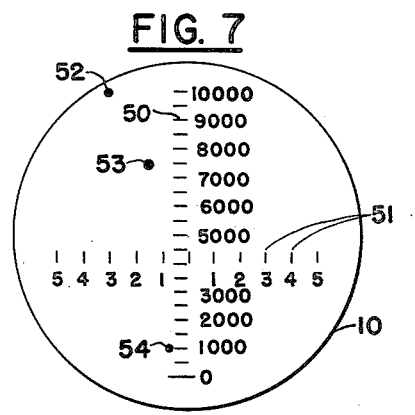
Figure 6:
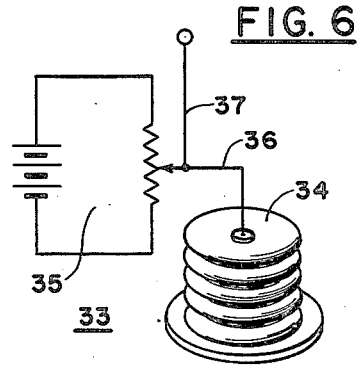
Figure 8:
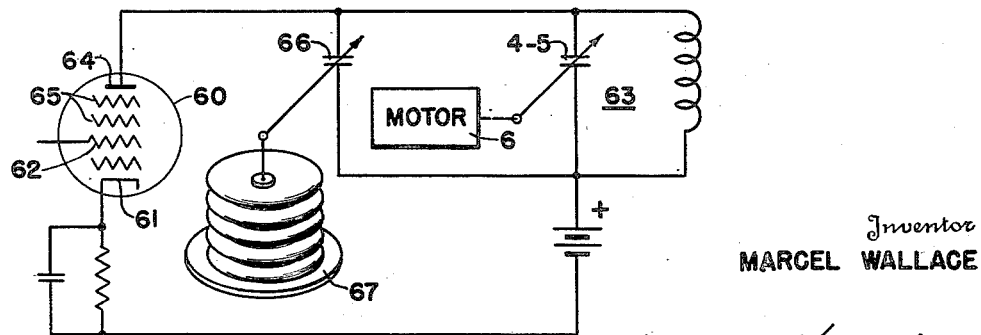

Figure 4 indicates schematically an airway defined by a plurality of beacon transmitter stations;

Figure 5 is a schematic block diagram of a transmitter receiver system, which may be installed aboard each of a plurality of aircraft, for receiving and analyzing beacon signals and for providing transmissions informative of the altitude of each aircraft, and of the course relation of the aircraft as determined from the analyzed beacon signals;

Figure 6 is a schematic diagram of a detail of Figure 5;

Figure 7 represents the appearance of the face of a cathode ray indicator, when utilized in the receiver system illustrated in Figures 1 and 2 of the drawings, for receiving and analyzing signals originating in transmitters similar to that illustrated in Figure 5 of the drawings; and Figure 8 is a circuit diagram of a device utilizable in the receivers illustrated in Figures 1 and 2.

Referring now to the drawings and particularly to Figure 1 thereof there is illustrated a receiver, in the simplest form of such an instrument, and comprising an R. F. amplifier 1 and a video detector 2 coupled to the amplifier 1 for abstracting from carrier signals impinging upon the antenna 3, modulation signals which may be associated with the said carrier signals.

The R. F. amplifier 1 and the detector 2 may be tuned through a desired frequency range or spectrum by means of condensers 4 and 5 respectively, which are preferably of the straight line-frequency type, the condensers 4 and 5 being ganged or simultaneously driven by a clock or motor 6, which may be of any type commercially available, and which serves to rotate the condensers 4 and 5 at any convenient rate of speed, although I prefer a rate in the vicinity of thirty cycles per second.

The mechanical coupling between the motive means 6 and the condensers 4 and 5 is indicated symbolically by a dotted line labelled 7, for purposes of identification, and which may comprise suitable shafting or other mechanical transmission devices.

The coupling 7 drives, in synchronism with the condensers 4 and 5, a mechanical sweep generator 8, and comprising generally a variable rheostat or potentiometer, for providing a continuously repetitive series of linear saw tooth voltages for application to a horizontal plate 9 of the cathode ray oscilloscope 10, the opposing plate 9a being grounded, the sweep voltages being symmetrical about the zero axis in amplitude, and being aligned or synchronized with the motions of the condensers 4 and 5 in such manner that the maximum positive value of sweep voltage corresponds with the minimum frequency to which the amplifier 1 and the detector 2 may be tuned, and the maximum negative value of sweep voltage corresponds with the maximum such frequency.

Signals appearing at the output of the detector 2, and consisting of a single frequency which may have any value within a predetermined range or spectrum of values, may be applied to a suitable video amplifier 11, the output of which is applied in parallel to an intensifier grid 12 of cathode ray indicator 10 and to a discriminator circuit 13. The latter is adapted and suitably tuned to provide a zero value D. C. output voltage for modulation signals having a value midway of the above mentioned predetermined spectrum of values, a negative D. C. voltage for modulation signals of lesser frequency than the mid-frequency and a positive D. C. voltage for modulation of greater value than the mid-frequency, the values of voltage varying in substantially linear fashion with the extent of deviation of the measured frequency from the said mid-frequency. Discriminators of the genre above described are well known in the radio and electrical arts, and a detailed description of an appropriate circuit is accordingly dispensed with.

The output of the discriminator 13 is applied to a vertical plate 14 of the cathode ray oscilloscope, the opposing electrical plate 14a being grounded.

In order to describe the mode of operation of the embodiment of my invention illustrated in Figure 1 of the drawings, and above described in detail, assume the presence of a signal of carrier frequency $f_o$ and modulation frequency $F_1$, the former receivable in the R. F. amplifier 1 and the latter coming within the operative range of the discriminator 13. The cathode ray beam, prior to the advent of a signal, periodically sweeps horizontally over the face of the indicator 10, but provides no indication or but slight indication by reason of a blocking or de-intensifying action of the grid 12, which is suitably biased negatively to enable accomplishment of this function. Should a signal be encountered during the cyclic tuning of the amplifier 4 and the detector 5, an intensifying voltage will be developed at the output of amplifier 11 contemporaneously with such encounter, and thereby a spot of light will be produced on the face of the screen at a horizontal position corresponding with the position of the signal within the swept spectrum of carrier frequencies.

The vertical position of the illuminated spot will be determined by the value of the modulation frequency F, as represented by the output voltage of the discriminator 13.

In still a further embodiment of my invention, illustrated in Figure 2 of the drawings, I provide an R. F. amplifier 1, a detector 2, an antenna 3, and tuning condensers 4 and 5 for tuning the R. F. amplifier 1 and the detector 2. The condensers 4 and 5 may be rotated continuously by means of a motive device 6 and actuating mechanism 7, which may preferably consist of a drive shaft. I prefer to utilize condensers of straight line-frequency type and to rotate the condensers 4 and 5, in the presently described embodiment of the invention, at a relatively slow rate of speed, of the order of 1 cycle per second. A sweep generator 8, similar to the identically numbered element of Figure 1 of the drawings, may be utilized to provide linear sweep voltages to a vertical plate 14a of the cathode ray oscilloscope 10, the opposing vertical plate 14 being grounded. There will accordingly be produced a concurrent synchronized frequency scanning action of the R. F. amplifier 1 and the detector 2 and a vertical scanning action of the cathode ray beam of the indicator 10.

Coupled to the output of the detector 2, I provide a tunable audio amplifier 15, tuned by a straight line-frequency condenser 16 which is driven at a rate of perhaps 60 cycles per second by means of a drive shaft 17, which is shown, for purposes of simplicity, as actuated from gearing 18, coupled to the drive shaft 7.

The amplifier 15 may be tuned over a range of frequencies corresponding with a desired range of modulation frequencies, and serves to scan that range of frequencies at a rapid rate, the pass band of the amplifier 15 being but a small fraction of that band. Synchronously with the scanning action of the amplifier 15 a horizontal sweep voltage is provided for cathode ray indicator 10 by means of a sweep generator 8a, which may be a duplicate of the sweep generator 8, and which is driven from the shaft 17 in synchronism with the condenser 16.

The output of the tunable narrow band audio amplifier 15 may be applied to a video amplifier 19 which provides intensifying voltage, upon occurrence of signals therein, to an intensifier grid 12 of the cathode ray oscilloscope 10. It will be understood that in the absence of signal in the output circuit of the amplifier 19, the grid 12 remains biased to block or to de-intensify the beam of the cathode ray indicator 10. Upon occurrence of output signals the bias voltage is overcome sufficiently to permit a visible or an intensified indication.

It will be clear, with relative horizontal and vertical scanning rates of 60 and 1 cycles per second, that the entire face of the indicator 10 will be scanned once each second. Upon reception of a carrier frequency $f$ bearing a single modulation frequency $F_1$ intensification of the cathode ray of the indicator 10 will be accomplished at a vertical position bearing a correspondence to the frequency $f$ and at a horizontal position bearing a correspondence with the frequency F, a single spot thus corresponding in location with a pair of frequencies.

Referring now again to Figure 1 of the drawings, the operation of the apparatus there illustrated will be considered, should a carrier signal modulated simultaneously with a pair of discrete audio frequencies, be applied thereto, one of the audio frequencies being below and another at an equal value above the mid-frequency to which the discriminator may be tuned. In such event the respective signals will cause generation of D. C. voltages of opposite polarities in the output of the discriminator 13, with consequent production of a resultant D. C. voltage of a magnitude and algebraic sign determined by the relative magnitudes of the modulation signals, and reducing to zero should the magnitudes of the respective modulation signals be equal in magnitude, as is true for on course signals.

The embodiment of my invention illustrated in Figure 1 of the drawings has accordingly on application to navigational systems employing course beacons which radiate simultaneously a pair of overlapping beams, each beam being modulated with a different frequency, and the equipotential lines of the beams defining a course for the guidance of an aircraft. We may assume, for example, a plurality of beacons sequentially located along an airway at predetermined distances or spacings, and each operating on a distinct frequency. The pair of modulation signals employed throughout the entire system may be the same. By utilizing a system of reception of the character of that disclosed in Figure 1 of the drawings, operators of aircraft will be enabled to determine approximate location of the craft along the airway by identifying the frequency of received signals, and simultaneously the relation of the craft to the centerline of the airway in terms of relative amplitudes of received modulations signals. Signals originating in more proximate beacon stations will be readily distinguishable from those originating in more remote stations in terms of greater brilliance of indications as well as in terms of greater line width of indications produced by the proximately originating signals.

Reference is here made to Figure 3 of the drawings, wherein is illustrated the appearance of the face of the cathode ray indicator 10, when utilized in a receiver-indicator of the character illustrated in Figure 1 of the drawings, in the course of reception of a plurality of in-line beacon signals, the indications 22 being interpreted to indicate proximity to transmitter #3, since the most intense signal appears opposite mark 3, and an off course position to the left of the course. The horizontal scale 20 of the indicator 10 may be calibrated in correspondence with geographically sequentially arranged beacon stations, #1, #2, #3, #4, etc., which transmit on a sequence of increasing carrier frequencies $f_1$, $f_2$, $f_3$, $f_4$, the left hand beam of each beacon being modulated with frequency $F_1$ and the right hand beam with frequency $F_2$, as illustrated schematically in Figure 4 of the drawings. The vertical scale 21 of the indicator 10 may be calibrated in terms of degrees off course.

The embodiment of my invention illustrated in Figure 1 of the drawings, and heretofore fully described, may find application in a device for conveying course and altitude information of aircraft, so-called because therein each aircraft flying a course such as that schematically illustrated in Figure 4 of the drawings is equipped with apparatus for transmitting radio signals the carrier frequency of which corresponds with the altitude of the craft, the modulation of that carrier corresponding with the relation of the craft to a course line which may be defined by one or more beacon transmitters, in a manner now well known in the art. The range of carrier frequencies corresponding with a range of altitudes within which the system may operate, may be so chosen as to fall within the tuning range of the R. F. amplifier 1 and the detector 2, Figure 1. The modulation frequencies applied to the carriers may be those derived aboard each craft directly at the output of a beacon receiver; alternatively, a single modulation frequency may be utilized for representing the degree off course of the transmitting craft, such single frequency being derived from the output of the beacon transmitter. In either case, all craft flying the airway concerned, may, if equipped with receivers of the character of that illustrated in Figure 1 of the drawings, be provided with simultaneous indications of the altitudes and course relationships of the various craft.

Referring now specifically to Figure 5 of the drawings, I show a transmitter 30, having associated therewith an antenna 31, the carrier frequency of transmitter 30 being controllable by means of a reactance tube modulator 32 which is, in turn, responsive to signals derived from an altitude responsive device 33, one simple example of which is illustrated in Figure 6 of the drawings and comprises an aneroid cell 34 and a potentiometer 35, the aneroid cell 34 controlling the setting of the potentiometer contact 36, whereby to provide a voltage at the potentiometer output lead 37 which is dependent upon altitude.

The transmitter 30 may be amplitude modulated by means of a modulator 38, which is supplied with signal from a signal generator 39, of such character that its output frequency may be modified in response to the action of the reactance tube modulator 40.

The reactance tube modulator 40 is supplied with control potential by a discriminator 41 which develops a D. C. output voltage in response to the relative amplitudes of a pair of modulation signals $F_1$ and $F_2$ available at the output of beacon receiver 41, and derived from beacon signals of well known character, and such as have been indicated in Figure 4 of the drawings.

In an alternative receiver-transmitter system the modulator 38 may be supplied via lead 42, upon closure of manually operative switch 43 with signals directly derived from the output of the beacon receiver, and which may comprise a pair of modulation signals, of frequency $F_1$ and $F_2$. In such case the signal generator 39 should be turned off. Receiver indicators of the characters of those illustrated in both Figure 1 and Figure 2 may be utilized for display simultaneously of a plurality of altitude-course indications, originating in each of a plurality of aircraft, should course representative signals comprise but a single modulating frequency originating in the signal generators 39 aboard the various craft. Receivers of the character of Figure 1 may, by proper choice of constants of the discriminator circuit 13, operate equally well in response to pairs of signals $F_1$, $F_2$ utilized as course representative modulations. Receivers of the character of Figure 2 of the drawings will produce a pair of indications in response to each pair of modulation frequencies $F_1$ and $F_2$, the indications being aligned vertically and each appearing on an opposite side of the horizontal base line of the indicator 10.

In Figure 7 of the drawings is illustrated the appearance of the face of the cathode ray indicator 10, in response to a plurality of altitude-course signals, the altitude scale being illustrated as being oriented in vertical attitude and the course scale in horizontal attitude. Each pair of vertical calibration marks 50 may be separated by a distance representing 500 feet of altitude and each pair of lateral marks 51 by a distance representing 100 feet off course. The dot 52 then represents an aircraft at an altitude of 10,000 feet which is 300 feet off course; the dot 53 represents an aircraft at an altitude of 7500 feet about 150 feet to the left off course, and the dot 54, still a further aircraft at an altitude of 1000 feet and about 30 feet off course, again to the left.

While I have illustrated a system for displaying on the face of a cathode ray indicator 10, the absolute altitudes of a plurality of craft, it will be obvious that the relative altitudes of the various craft with respect to each craft may be indicated by tuning the central frequency of each receiver until the indication representative of that craft is centered vertically on the face of the scope. This may be accomplished manually, if desired, but is preferably accomplished automatically. One mode of automatically tuning a translating device, which may correspond to the amplifier 1 or the detector 2, Figures 1 and 2, to a central frequency corresponding with the altitude of the craft, while permitting simultaneous frequency variation of that tuning in response to the mechanical variations of the condensers 4, 5, is illustrated schematically in Figure 8 of the drawings, wherein is illustrated a translating device having a tuned circuit 63 tunable by means of a variable condenser 4—5, driven by a motor 6, and connected in the plate circuit of a tube 60, having a cathode 61, a control grid 62, and a plate 64 and if desired still further grids, collectively designated by numeral 65, and having various suppression and screening functions. Connected across the condenser 4—5, and consequently constituting part of the tuned circuit 63 is a further condenser 66, the setting of which is adjustable in response to the reading of an aneroid cell 67. By proper design of the cell 67, the condenser 66 and the mechanical linkage interconnecting the two, it is possible to vary the center frequency of the translating device 1—2 in correspondence with altitude of the craft aboard which the receiving equipment may be installed, and thereby in frequency correspondence with the local transmitter 30. Other expedients for accomplishing such frequency correspondence will suggest themselves to those versed in the pertinent art, and which may be utilized in place of the expedient suggested in Figure 8 of the drawings, but no desirable object will be served by providing detailed expositions thereof.

In order to avoid blocking the receiver (Figure 1) by the intense field produced by a transmitter 30, located on the same craft therewith, it will generally be advisable to shield the transmitter antenna 31 from the receiver antenna 3, as by locating one antenna above and the other below the fuselage of the aircraft.

While I have disclosed a plurality of embodiments of my invention it will be clear that various modifications thereof, as by rearrangement of elements and substitution of equivalent parts, may be resorted to without departing from the spirit of the invention or the scope of the appended claims.

What I claim and desire to secure by Letters Patent of the United States is:

1. A device for measuring the carrier frequencies and the modulation frequencies of a band of carriers each modulated with at least one modulation frequency comprising, a frequency scanning receiver for said carriers, said frequency scanning receiver comprising a scanning detector for detecting the modulations of said carriers in succession during said scanning, means for analyzing the frequencies of said detected modulations, and means responsive to said scanning detector and said analyzing means for providing a single composite indication of the frequency of each of said carriers and the frequency of its modulation, respectively as displacements of said indication in different coordinate directions.

2. The combination in accordance with claim 1 wherein said means for analyzing the frequencies of said modulations comprises a frequency scanning channel.

3. The combination in accordance with claim 1 wherein said means for analyzing the frequencies of the modulations of said carriers comprises a frequency discriminator detector.

4. A receiver for measuring the frequency of each carrier of a band of carrier wave signals and the frequency of the modulation of said carrier wave signals, comprising, a tunable receiving channel for said carrier wave signals, means for periodically tuning said tunable receiving channel over said band for receiving said carrier wave signals in succession, means for measuring the frequency of modulation of each of said carrier wave signals only when that carrier wave signal is received by said tunable receiving channel, and means responsive to said tunable receiving channel and the said measuring means for indicating as a single composite indication the frequency of each of said carrier wave signals and the frequency of its modulation, respectively as displacements of said indication in different coordinate directions.

5. The combination in accordance with claim 4 wherein said means for measuring the frequency of modulation of each of said carrier wave signals comprises a frequency discriminator detector.

6. The combination in accordance with claim 4 wherein said means for measuring the frequency of modulation of each of said carrier wave signals comprises a frequency scanning channel.

7. A receiver comprising a receiving channel tunable over a predetermined frequency range, means for periodically tuning said receiving channel over said predetermined frequency range, a cathode ray indicator having means for generating an electron beam, means for deflecting said electron beam in a first direction, means for synchronizing said deflecting means with said tuning means, means for detecting the signal output of said receiving channel, means for measuring the frequency of signals provided by said detecting means in response to said signal output, and means responsive to said measuring for deflecting said electron beam in a second direction to an extent determined by said last named frequency.

8. The combination in accordance with claim 7 wherein said means for measuring comprises a frequency discriminator detector.

9. In a panoramic receiver for measuring the frequency content of modulated wave energy signals occurring in a predetermined spectrum, frequency scanning means for periodically scanning said spectrum, means for detecting each wave energy signal encountered during said scanning, a frequency discriminator detector responsive to said detecting means, a cathode ray tube indicator having means for generating a normally de-intensified cathode ray beam and means for deflecting said beam in coordinate directions, means for controlling said deflecting means to sweep said beam in one of said coordinate directions in synchronism with said scanning, means responsive to signal output from said frequency discriminator detector for controlling said deflecting means to sweep said beam in the other of said coordinate directions in accordance with the amplitude of said signal output, and means responsive to said each wave energy signal for intensifying said beam.

10. In a panoramic receiver for analyzing the frequency content of modulated wave energy signals occurring in a predetermined spectrum, frequency scanning means for periodically scanning said spectrum at a first rate of scan, means for detecting each wave energy signal encountered during said scanning to provide a further spectrum of frequencies, a further frequency scanning means for further periodically scanning said further spectrum of frequencies at a second rate of scan more rapid than said first rate of scan, a cathode ray tube indicator having means for generating a normally de-intensified beam of electrons, means for deflecting said beam of electrons in coordinate directions in synchronism respectively with said first mentioned and further scanning, and means responsive to each signal encountered by said means for further periodically scanning for intensifying said beam of electrons.

References Cited in the file of this patent

UNITED STATES PATENTS

| | | |
|---|---|---|
| 2,084,760 | Beverage | June 22, 1937 |
| 2,149,808 | Ellis | Mar. 7, 1939 |
| 2,180,107 | Hathaway | Nov. 14, 1939 |
| 2,288,196 | Kramar | June 30, 1942 |
| 2,293,949 | Potter | Aug. 25, 1942 |
| 2,312,203 | Wallace | Feb. 23, 1943 |
| 2,355,363 | Christaldi | Aug. 8, 1944 |
| 2,369,011 | Braden | Feb. 6, 1945 |
| 2,378,604 | Wallace | June 19, 1945 |
| 2,381,940 | Wallace et al. | Aug. 14, 1945 |
| 2,404,333 | Whalley et al. | July 16, 1946 |
| 2,414,096 | Dimond | Jan. 14, 1947 |
| 2,416,346 | Potter | Feb. 25, 1947 |
| 2,422,691 | Mason | June 24, 1947 |
| 2,485,620 | McCoppin | Oct. 25, 1949 |
| 2,502,294 | Wallace | Mar. 28, 1950 |

FOREIGN PATENTS

| | | |
|---|---|---|
| 113,637 | Australia | Aug. 21, 1941 |

OTHER REFERENCES

Panoramic Principles, W. E. Moulic, Electronic Industries, July 1944, pages 86, 87, 88, 100.